United States Patent
Lewis et al.

(10) Patent No.: US 6,688,748 B2
(45) Date of Patent: Feb. 10, 2004

(54) SYSTEM AND METHOD FOR USING OFF-AXIS ILLUMINATION IN A REFLECTIVE PROJECTION SYSTEM

(75) Inventors: Isabella T. Lewis, San Jose, CA (US); Melvin Francis, Tigard, OR (US); Matthew F. Bone, Fremont, CA (US)

(73) Assignee: Aurora Systems, Inc., San Jose, CA (US)

(*) Notice: Subject to any disclaimer, the term of this patent is extended or adjusted under 35 U.S.C. 154(b) by 0 days.

(21) Appl. No.: 09/760,211

(22) Filed: Jan. 12, 2001

(65) Prior Publication Data

US 2002/0093628 A1 Jul. 18, 2002

(51) Int. Cl.⁷ ............................................. G03B 21/14
(52) U.S. Cl. ......................................... 353/69; 353/81
(58) Field of Search ........................... 353/81, 69, 70, 353/38; 349/5, 8, 9

(56) References Cited

U.S. PATENT DOCUMENTS

| | | | |
|---|---|---|---|
| 3,637,308 A | * 1/1972 | Van Raalte et al. | 353/69 |
| 3,704,936 A | * 12/1972 | Gorkiewicz et al. | 353/69 |
| 3,790,267 A | * 2/1974 | Ramberg | 353/70 |
| 5,355,188 A | 10/1994 | Biles et al. | 353/69 |
| 5,379,135 A | 1/1995 | Nakagaki et al. | 359/40 |
| 5,422,691 A | 6/1995 | Ninomiya et al. | 353/69 |
| 5,504,544 A | 4/1996 | Dreyer et al. | 353/38 |
| 5,706,062 A | 1/1998 | Stolov | 348/761 |
| 5,865,521 A | 2/1999 | Hashizume et al. | 353/38 |
| 5,973,845 A | * 10/1999 | Hildebrand et al. | 359/630 |
| 6,046,858 A | * 4/2000 | Scott et al. | 359/634 |
| 6,076,931 A | 6/2000 | Bone et al. | 353/100 |
| 6,113,240 A | * 9/2000 | Iizuka | 353/31 |

* cited by examiner

Primary Examiner—William Dowling
(74) Attorney, Agent, or Firm—Henneman & Saunders; Larry E. Henneman, Jr.

(57) ABSTRACT

A novel projection system includes an illumination source for emitting an illumination beam, a reflective display device for modulating the illumination beam to form a reflected imaging beam, a projection lens group having an optical axis, and a field lens group. The field lens group is de-centered with respect to the optical axis of the projection lens group and is disposed to redirect the illumination beam to illuminate the display device at a non-zero angle of incidence, and to redirect the reflected imaging beam along an optical path parallel to the optical path of the projection lens group. In a particular embodiment the display device is disposed on the optical axis of the projection lens group. In a more particular embodiment, the redirected portion of the optical path of the reflected imaging beam is coincident with the optical axis of the projection lens group. In another particular embodiment, the display device is tilted with respect to the optical axis of the projection lens group to accommodate the tilt in focal plane of the projection lens group caused by the redirection of the imaging beam.

22 Claims, 17 Drawing Sheets

OPTICAL PRESCRIPTION

GENERAL LENS DATA:

| | |
|---|---|
| Surfaces | : 53 |
| Stop | : 19 |
| System Aperture | : Image Space F/# = 3.5 |
| Glass Catalogs | : schott |
| Ray Aiming | : Paraxial Reference, Cache On |
| X Pupil shift | : 0 |
| Y Pupil shift | : 0 |
| Z Pupil shift | : 0 |
| Apodization | :Uniform, factor = 0.00000E+000 |
| Effective Focal Length | : 17.30586 (in air) |
| Effective Focal Length | : 17.30586 (in image space) |
| Back Focal Length | : -1.41264 |
| Total Track | : 304 |
| Image Space F/# | : 3.5 |
| Paraxial Working F/# | : 3.51222 |
| Working F/# | : 3.525914 |
| Image Space NA | : 0.1409391 |
| Object Space NA | : 0.005798216 |
| Stop Radius | : 8.777825 |
| Paraxial Image Height | : 12.41447 |
| Paraxial Magnification | : -0.0407299 |
| Entrance Pupil Diameter | : 4.944531 |
| Entrance Pupil Position | : 286.3766 |
| Exit Pupil Diameter | : 57.68271 |
| Exit Pupil Position | : 203.3021 |
| Field Type | : Object height in Millimeters |
| Maximum Field | : 304.8 |
| Primary Wave | : 0.555 |
| Lens Units | : Millimeters |
| Angular Magnification | : -0.08571947 |

FIG. 9A

```
Fields              : 8
Field Type: Object height in Millimeters
  #        X-Value           Y-Value          Weight
  1       0.000000          0.000000        1.000000
  2     243.840000        182.880000        1.000000
  3     192.000000         91.200000        1.000000
  4       0.000000        182.880000        1.000000
  5     243.840000          0.000000        1.000000
  6     243.840000       -182.880000        1.000000
  7       0.000000       -182.880000        1.000000
  8     192.000000        -91.200000        1.000000

Vignetting Factors
  #      VDX         VDY         VCX         VCY
  1   0.000000    0.000000    0.000000    0.000000
  2   0.000000    0.000000    0.000000    0.000000
  3   0.000000    0.000000    0.000000    0.000000
  4   0.000000    0.000000    0.000000    0.000000
  5   0.000000    0.000000    0.000000    0.000000
  6   0.000000    0.000000    0.000000    0.000000
  7   0.000000    0.000000    0.000000    0.000000
  8   0.000000    0.000000    0.000000    0.000000

Wavelengths         : 5
Units: Microns
  #        Value           Weight
  1       0.470000        0.091000
  2       0.510000        0.503000
  3       0.555000        1.000000
  4       0.610000        0.503000
  5       0.650000        0.107000
```

FIG. 9B

SURFACE DATA SUMMARY:

| Surf | Type | Comment | Radius | Thickness | Glass | Diameter | Conic |
|---|---|---|---|---|---|---|---|
| OBJ | STANDARD | | Infinity | 140 | | 609.6 | 0 |
| 1 | COORDBRK | | | 0 | | - | - |
| 2 | STANDARD | | Infinity | 0 | MIRROR | 609.9846 | 0 |
| 3 | COORDBRK | | - | 0 | | - | - |
| 4 | STANDARD | | Infinity | -248 | | 417.8938 | 0 |
| 5 | COORDBRK | | - | 0 | | - | - |
| 6 | COORDBRK | | - | 0 | | - | - |
| 7 | EVENASPH | | 178.6901 | -6 | 1.491668, 55.310192 | 67.00051 | 0 |
| 8 | EVENASPH | 6 | -39.42224 | -50 | | 47.88294 | 0 |
| 9 | COORDBRK | | - | 0 | | - | - |
| 10 | COORDBRK | | - | 0 | | - | - |
| 11 | STANDARD | | Infinity | 0 | MIRROR | 42.97209 | 0 |
| 12 | COORDBRK | | - | 0 | | - | - |
| 13 | STANDARD | | Infinity | 38.51608 | | 36.84685 | 0 |
| 14 | STANDARD | TP 1.1460 | -29.108 | 3 | LAK8 | 24.03219 | 0 |
| 15 | STANDARD | TP 2.346 | -59.5884 | 0.2 | | 24.82568 | 0 |
| 16 | STANDARD | TP 5.6101 | 142.496 | 3 | LASF3 | 24.85084 | 0 |
| 17 | STANDARD | TP 0.7602 | 19.309 | 7.3 | SF14 | 24.36006 | 0 |
| 18 | STANDARD | TP 3.1832 | -80.85328 | 21.07947 | | 24.27778 | 0 |
| STO | STANDARD | TP 1.7820 | -45.2623 | 3 | SF6 | 17.55565 | 0 |
| 20 | STANDARD | TP 1.3881 | 35.2577 | 5.099995 | SK4 | 19.9445 | 0 |
| 21 | STANDARD | | -35.2577 | 0.2 | | 21.15012 | 0 |
| 22 | STANDARD | TP 2.3099 | 58.67146 | 4.41 | SSK51 | 22.85238 | 0 |
| 23 | STANDARD | TP 2.1506 | -54.6252 | 0.9999488 | | 23.23788 | 0 |
| 24 | STANDARD | | Infinity | 28 | BK7 | 23.32803 | 0 |

FIG. 9C

| | | | | | |
|---|---|---|---|---|---|
| 25 STANDARD | | Infinity | | | 0 |
| 26 COORDBRK | | — | 48 | | |
| 27 COORDBRK | TILT FIELD LENS | — | 0 | | 1 |
| 28 STANDARD | TP 4.196 | 106.5784 | 0 | | 1 |
| 29 STANDARD | | Infinity | 4.2 | SF57 | 0 |
| 30 COORDBRK | | — | 0 | | 0 |
| 31 STANDARD | | Infinity | 1 | | 1 |
| 32 STANDARD | | Infinity | 0.7 | BK7 | 0 |
| 33 STANDARD | ULCD | Infinity | 0 | | 0 |
| 34 STANDARD | | Infinity | 0 | MIRROR | 0 |
| 35 STANDARD | | Infinity | −0.7 | BK7 | 0 |
| 36 STANDARD | | Infinity | −1 | | 0 |
| 37 COORDBRK | | — | 0 | | 1 |
| 38 STANDARD | | Infinity | −4.2 | SF57 | 0 |
| 39 STANDARD | | 106.5784 | 0 | | 0 |
| 40 COORDBRK | | — | 0 | | 1 |
| 41 COORDBRK | UNTILT FIELD LENS | — | −48 | | 0 |
| 42 STANDARD | | Infinity | −40 | | 0 |
| 43 STANDARD | | Infinity | 40 | | 0 |
| 44 STANDARD | | Infinity | 48 | | 1 |
| 45 STANDARD | | Infinity | 0 | | 0 |
| 46 COORDBRK | | — | 0 | | 0 |
| 47 COORDBRK | TILT FIELD LENS | — | 0 | | 1 |
| 48 STANDARD | | 106.5784 | 4.2 | SF57 | 0 |
| 49 STANDARD | | Infinity | 0 | | 0 |
| 50 COORDBRK | | — | 1 | | 1 |
| 51 STANDARD | | Infinity | 0.7 | BK7 | 0 |
| 52 STANDARD | | Infinity | 0 | | 0 |
| IMA STANDARD | | Infinity | | | 0 |

Surface data continued with thickness values 24.06586, 55.25607, 55.08193, 25.16091, 24.94614, 24.94614, 24.94614, 25.0931, 53.92453, 53.87472, 27.0162, 80.92517, 137.6562, 80.92517, 53.87472, 53.92453, 25.0931, 24.94614, 24.94614.

FIG. 9D

SURFACE DATA DETAIL:

| | | |
|---|---|---|
| Surface OBJ | : | STANDARD |
| Scattering | : | None |
| Surface 1 | : | COORDBRK |
| Decenter X | : | 0 |
| Decenter Y | : | 0 |
| Tilt About X | : | -33 |
| Tilt About Y | : | 0 |
| Tilt About Z | : | 0 |
| Order | : | Decenter then tilt |
| Scattering | : | None |
| Surface 2 | : | STANDARD |
| Scattering | : | None |
| Surface 3 | : | COORDBRK |
| Decenter X | : | 0 |
| Decenter Y | : | 0 |
| Tilt About X | : | -33 |
| Tilt About Y | : | 0 |
| Tilt About Z | : | 0 |
| Order | : | Decenter then tilt |
| Scattering | : | None |
| Surface 4 | : | STANDARD |
| Scattering | : | None |
| Surface 5 | : | COORDBRK |
| Decenter X | : | 0 |
| Decenter Y | : | 0 |
| Tilt About X | : | -0.17215857 |
| Tilt About Y | : | 0 |
| Tilt About Z | : | 0 |
| Order | : | Decenter then tilt |
| Scattering | : | None |
| Surface 6 | : | COORDBRK |
| Decenter X | : | 0 |
| Decenter Y | : | -4.4849655 |
| Tilt About X | : | 0 |
| Tilt About Y | : | 0 |
| Tilt About Z | : | 0 |
| Order | : | Decenter then tilt |
| Scattering | : | None |

FIG. 9E

```
Surface      7        : EVENASPH
 Comment              : 6
 Coeff on r   2       :       -0.0068101369
 Coeff on r   4       :                   0
 Coeff on r   6       :        7.5889271e-011
 Coeff on r   8       :                   0
 Coeff on r  10       :                   0
 Coeff on r  12       :                   0
 Coeff on r  14       :                   0
 Coeff on r  16       :                   0
 Scattering           : None
Surface      8        : EVENASPH
 Coeff on r   2       :       -0.013007995
 Coeff on r   4       :       -3.465254e-006
 Coeff on r   6       :                   0
 Coeff on r   8       :                   0
 Coeff on r  10       :                   0
 Coeff on r  12       :                   0
 Coeff on r  14       :                   0
 Coeff on r  16       :                   0
 Scattering           : None
Surface      9        : COORDBRK
 Decenter X           :                   0
 Decenter Y           :          -1.5432298
 Tilt About X         :                   0
 Tilt About Y         :                   0
 Tilt About Z         :                   0
 Order                : Decenter then tilt
 Scattering           : None
Surface     10        : COORDBRK
 Decenter X           :                   0
 Decenter Y           :                   0
 Tilt About X         :                  33
 Tilt About Y         :                   0
 Tilt About Z         :                   0
 Order                : Decenter then tilt
 Scattering           : None
Surface     11        : STANDARD
 Scattering           : None
```

FIG. 9F

```
Surface  12        : COORDBRK
 Decenter X        :                    0
 Decenter Y        :                    0
 Tilt About X      :                   33
 Tilt About Y      :                    0
 Tilt About Z      :                    0
 Order             : Decenter then tilt
 Scattering        : None
Surface  13        : STANDARD
 Scattering        : None
Surface  14        : STANDARD
 Comment           : TP 1.1460
 Scattering        : None
Surface  15        : STANDARD
 Comment           : TP 2.346
 Scattering        : None
Surface  16        : STANDARD
 Comment           : TP 5.6101
 Scattering        : None
Surface  17        : STANDARD
 Comment           : TP 0.7602
 Scattering        : None
Surface  18        : STANDARD
 Comment           : TP 3.1832
 Scattering        : None
Surface STO        : STANDARD
 Comment           : TP 1.7820
 Scattering        : None
Surface  20        : STANDARD
 Comment           : TP 1.3881
 Scattering        : None
Surface  21        : STANDARD
 Scattering        : None
Surface  22        : STANDARD
 Comment           : TP 2.3099
 Scattering        : None
Surface  23        : STANDARD
 Comment           : TP 2.1506
 Scattering        : None
Surface  24        : STANDARD
 Scattering        : None
Surface  25        : STANDARD
 Scattering        : None
```

FIG. 9G

```
Surface  26        : COORDBRK
 Decenter X        :                   0
 Decenter Y        :           17.673295
 Tilt About X      :                   0
 Tilt About Y      :                   0
 Tilt About Z      :                   0
 Order             : Decenter then tilt
 Scattering        : None
Surface  27        : COORDBRK
 Comment           : TILT FIELD LENS
 Decenter X        :                   0
 Decenter Y        :                   0
 Tilt About X      :           4.9686119
 Tilt About Y      :                   0
 Tilt About Z      :                   0
 Order             : Decenter then tilt
 Scattering        : None
Surface  28        : STANDARD
 Comment           : TP 4.196
 Scattering        : None
Surface  29        : STANDARD
 Scattering        : None
Surface  30        : COORDBRK
 Decenter X        :                   0
 Decenter Y        :           -17.67448
 Tilt About X      :                   0
 Tilt About Y      :                   0
 Tilt About Z      :                   0
 Order             : Decenter then tilt
 Scattering        : None
Surface  31        : STANDARD
 Scattering        : None
Surface  32        : STANDARD
 Scattering        : None
Surface  33        : STANDARD
 Comment           : ULCD
 Scattering        : None
Surface  34        : STANDARD
 Scattering        : None
Surface  35        : STANDARD
 Scattering        : None
Surface  36        : STANDARD
 Scattering        : None
```

FIG. 9H

```
Surface  37         : COORDBRK
  Decenter X        :                      0
  Decenter Y        :               17.67448
  Tilt About X      :                      0
  Tilt About Y      :                      0
  Tilt About Z      :                      0
  Order             : Decenter then tilt
  Scattering        : None
Surface  38         : STANDARD
  Scattering        : None
Surface  39         : STANDARD
  Scattering        : None
Surface  40         : COORDBRK
  Decenter X        :                      0
  Decenter Y        :                      0
  Tilt About X      :             -4.9686119
  Tilt About Y      :                      0
  Tilt About Z      :                      0
  Order             : Decenter then tilt
  Scattering        : None
Surface  41         : COORDBRK
  Comment           : UNTILT FIELD LEN
  Decenter X        :                      0
  Decenter Y        :             -17.673295
  Tilt About X      :                      0
  Tilt About Y      :                      0
  Tilt About Z      :                      0
  Order             : Decenter then tilt
  Scattering        : None
Surface  42         : STANDARD
  Scattering        : None
Surface  43         : STANDARD
  Scattering        : None
Surface  44         : STANDARD
  Scattering        : None
Surface  45         : STANDARD
  Scattering        : None
Surface  46         : COORDBRK
  Decenter X        :                      0
  Decenter Y        :              17.673295
  Tilt About X      :                      0
  Tilt About Y      :                      0
  Tilt About Z      :                      0
  Order             : Decenter then tilt
  Scattering        : None
```

FIG. 9I

```
Surface   47         : COORDBRK
  Comment            : TILT FIELD LENS
  Decenter X         :                 0
  Decenter Y         :                 0
  Tilt About X       :         4.9686119
  Tilt About Y       :                 0
  Tilt About Z       :                 0
  Order              : Decenter then tilt
  Scattering         : None
Surface   48         : STANDARD
  Scattering         : None
Surface   49         : STANDARD
  Scattering         : None
Surface   50         : COORDBRK
  Decenter X         :                 0
  Decenter Y         :         -17.67448
  Tilt About X       :                 0
  Tilt About Y       :                 0
  Tilt About Z       :                 0
  Order              : Decenter then tilt
  Scattering         : None
Surface   51         : STANDARD
  Scattering         : None
Surface   52         : STANDARD
  Scattering         : None
Surface  IMA         : STANDARD
  Scattering         : None
```

FIG. 9J

SYSTEM AND METHOD FOR USING OFF-AXIS ILLUMINATION IN A REFLECTIVE PROJECTION SYSTEM

BACKGROUND OF THE INVENTION

1. Field of the Invention

This invention relates generally to projection systems, and more particularly to a novel off axis projection system including a de-centered field lens group.

2. Description of the Background Art

Reflective liquid crystal displays (LCDs) provide many advantages over transmissive LCDs, and are, therefore, becoming increasingly more popular for use in projection systems. For example, transmissive displays typically have a limited aperture ratio (i.e., the total area available for light to shine through a pixel) and require pixel fill to separate the pixels, resulting in a pixelated image. The limitations of transmissive displays pose formidable problems in building bright, high-resolution displays at a reasonable cost. Reflective LCDs, on the other hand, include an array of highly reflective mirrors manufactured on a standard processed CMOS silicon chip back plane driver, using sub-micron metalization processes recently developed by VLSI process engineers, and do not, therefore, suffer from the limitations of the transmissive displays.

Although superior to transmissive displays in brightness and resolution, reflective displays do pose additional system design problems. For example, FIG. 1 shows a prior art, on-axis projector system 100 to include an illumination source 102, a polarizing beam splitter 104, a color separator 106, a plurality of liquid crystal displays (LCDs) 108(r, g, and b), and projection optics 110. Illumination source 102 generates a source beam of white light and directs the source beam toward polarizing beam splitter 104, which passes one portion of the source beam having a first polarity, and redirects another portion (an illumination beam) of the source beam having a second polarity along a system axis 112, toward color separator 106. Color separator 106 separates the illumination beam into its red, green, and blue components, and directs each of these colored illumination beams to a respective one of LCDs 108(r, g, and b). Each of LCDs 108(r, g, and b) is controlled by a system, e.g., a computer or other video signal source (not shown), and modulates the polarity of selective portions (i.e., pixels) of the colored illumination beams to form colored imaging beams, which are reflected back toward color separator 106. Color separator 106 recombines the colored imaging beams to form a composite imaging beam and directs the composite imaging beam back along the optical axis 112 of projection optics 110, toward polarizing beam splitter 104, which passes only the modulated portions of the composite imaging beam to projection optics 110. Projection optics 110 then focuses the modulated portions of the composite imaging beam onto a display surface (not shown).

Because the illumination beams and the imaging beams in system 100 both travel along the same path (i.e., axis 112), projection system 100 is considered an "on-axis" system. On-axis projection systems generally require a polarizing beam splitter such as polarizing beam splitter 104, and, therefore, suffer from the following limitations. First, polarizing beam splitters are highly angular sensitive. Second, polarizing beam splitter 104 must perform both the polarizing function and the analyzing function, and must, therefore, work well for both orthogonal states (S & P) of polarization, thus requiring undesirable manufacturing compromises. Furthermore, polarizing beam splitter 104 introduces a significant path length through glass, which can induce undesirable aberrations in the incident and imaging beams, due to stress induced birefringence. Finally, polarizing beam splitters are very expensive, compared to, for example, polymer based polarizing films.

FIG. 2 shows an off-axis projection system 200 that does not require a polarizing beam splitter. Projection system 200 includes an illumination source 202, a condenser lens 204, a polarizer 206, a field lens 207, a reflective LCD 208, an analyzer 210, and a projection lens group 212. Illumination source 202 generates an illumination beam 214 that is focused by condenser lens 204 to pass through polarizer 206, and impinge on LCD 208 at a non-perpendicular angle (non-zero angle of incidence). LCD 208 modulates illumination beam 214 to form an imaging beam 216, and reflects imaging beam 216 toward projection lens group 212. Field lens 207 is disposed adjacent reflective LCD 208, and focuses the aperture stop (not shown) of illumination source 202 at a field stop (not shown) near the rear of projection lens group 212. The angular separation between illumination beam 214 and imaging beam 216 allows for the separation of polarizer 206 and analyzer 210.

Projection lens group 212 focuses imaging beam 216 to project a magnified image of LCD 208 on a display surface 220. In a configuration such as system 200, with a net average angle between LCD 208 and imaging beam 216, projection lens group 212 would typically be used as shown (i.e., not symmetrical about its optical axis 218) to avoid keystone distortion. Imaging beam 216 thus forms a non-zero angle with optical axis 218 of projection lens group 212.

The complexity of projection lens group 212 depends on the amount of angular separation between its optical axis 218 and the axis of imaging beam 216. In particular, for an angular separation between imaging beam 216 and optical axis 218 of projection lens group 212 adequate to permit a separate polarizer and analyzer (e.g., 12°), the total design field-of-view for the projection lens would be on the order of 30% larger than a similar on-axis system projecting a similar image on display surface 220. The resulting projection lens group 212 would tend to have excessive distortion, would be more complex, and would be more expensive than that required for the similar on-axis system. For typical distortion limits of <0.25% in display applications, size benefits on the order of 30% reduction in track length can be achieved if the field-of-view is reduced.

What is needed, therefore, is a projection system, which allows the angular separation of the illumination beam and the imaging beam, without displacing and/or distorting the projected image, and without increasing the required field-of-view of the projection lens.

SUMMARY

The present invention overcomes the problems associated with the prior art by providing a novel system and method for using off axis illumination in a reflective projection system. The invention facilitates the angular separation of an illumination beam and an imaging beam, without displacing and/or distorting the projected image, and easing the design requirements for a projection lens group.

The projection system includes an illumination source for emitting an illumination beam, a reflective display device for modulating the illumination beam to form a reflected imaging beam, a projection lens group, and a field lens group. The field lens group is de-centered with respect to the optical axis of the projection lens group and is disposed to bend the illumination beam and the imaging beam. The field lens group redirects the illumination beam to illuminate the display device at a non-zero angle of incidence, and redirects the reflected imaging beam along an optical path parallel to the optical path of the projection lens group. In a particular embodiment the display device is disposed on the optical axis of the projection lens group. In a more particular embodiment, the redirected portion of the optical path of the reflected imaging beam is coincident with the optical axis of the projection lens group. In another particular embodiment, the display device is tilted with respect to the optical axis of the projection lens group to accommodate the tilt in the focal plane of the projection lens group caused by the redirection of the imaging beam.

In one embodiment, the field lens group includes a centered field lens and an optical wedge. In an alternate embodiment, the field lens group includes a substantially de-centered field lens. In a particular alternate embodiment, the field lens group consists of a single, substantially de-centered field lens.

Another particular embodiment, where the display device is a liquid crystal display (LCD), further includes a linear polarizer disposed in the illumination beam and an analyzer (also a linear polarizer) disposed in the imaging beam.

Yet another particular embodiment, capable of multicolored projection, includes a color separator to separate the illumination beam into a plurality of colored illumination beams, a plurality of display devices, a plurality of field lens groups, and a color combiner. Each of the display devices modulates an associated one of the colored illumination beams to form an associated colored imaging beam. Each of the field lens groups is de-centered with respect to the optical axis of the projection lens group, and is disposed to redirect an associated one of the colored imaging beams along an optical path parallel to the optical axis of the projection lens group. The color combiner recombines the colored imaging beams to form the imaging beam directed to the projection lens group.

A method of projecting a display image is also described. The method includes the steps of providing a reflective display device, providing a projection lens group, directing an illumination beam to illuminate the display device at a non-zero angle of incidence, modulating the illumination beam with the display device to form a reflected imaging beam, and redirecting the reflected imaging beam along an optical path parallel to the optical axis of the projection lens group. In a particular method, the step of redirecting the reflected imaging beam along an optical path parallel to the optical axis of the projection lens group includes redirecting the reflected imaging beam along an optical path coincident with the optical axis of the projection lens group.

BRIEF DESCRIPTION OF THE DRAWINGS

The present invention is described with reference to the following drawings, wherein like reference numbers denote substantially similar elements:

FIGS. 9(A–J) set forth an optical prescription detailing a particular embodiment of the present invention.

DETAILED DESCRIPTION

The present invention overcomes the problems associated with the prior art, by using a de-centered field lens group to redirect an off-axis imaging beam along the optical axis of a projection lens group. In the following description, numerous specific details are set forth (e.g., the optical prescription for one embodiment of the invention) in order to provide a thorough understanding of the invention. Those skilled in the art will recognize, however, that the invention may be practiced apart from these specific details. In other instances, details of well known optical practices (e.g., routine optimization) and components have been omitted, so as not to unnecessarily obscure the present invention.

Figure 1:
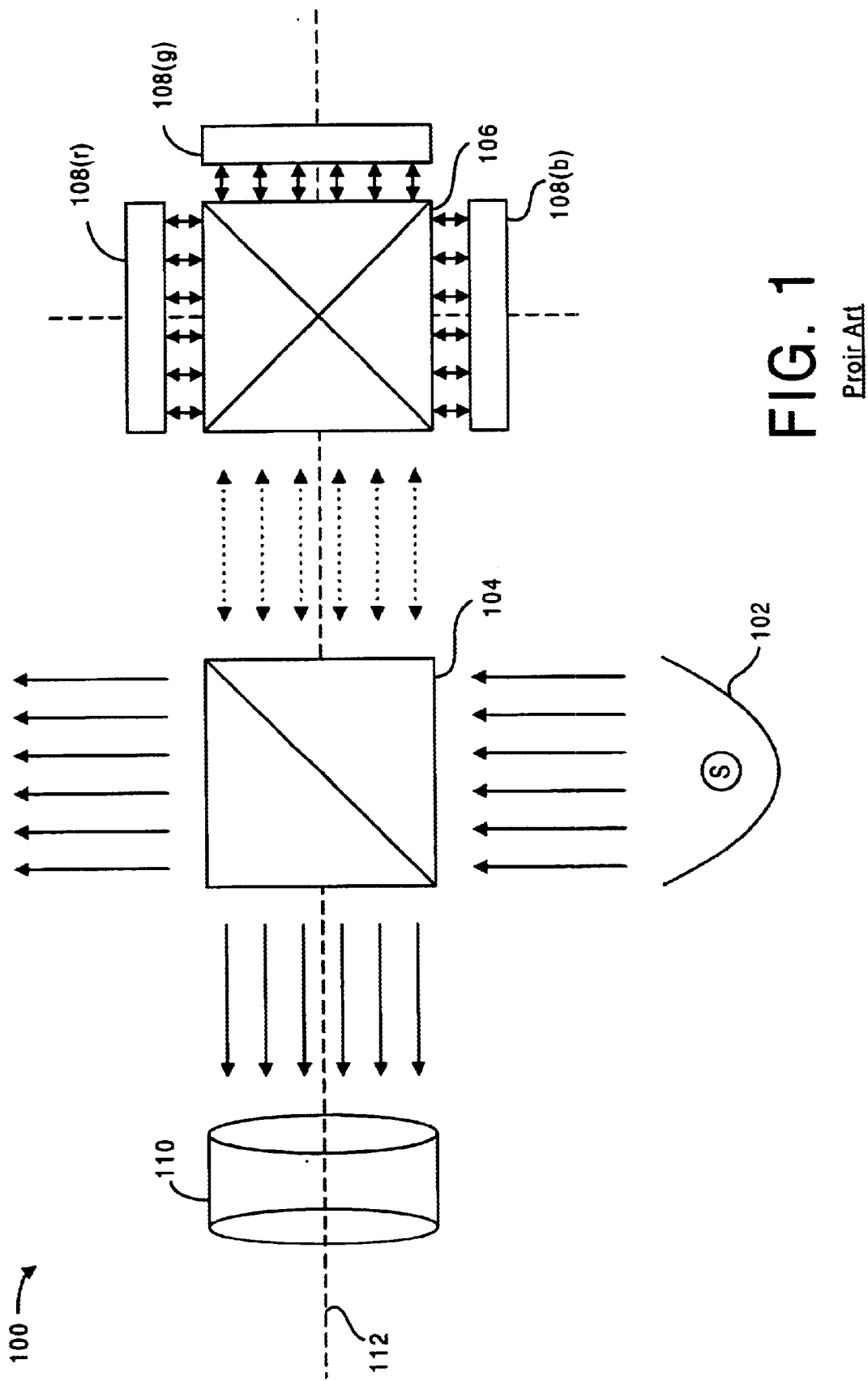
FIG. 1 is a block diagram of a prior art, on-axis projection system.
Figure 2:
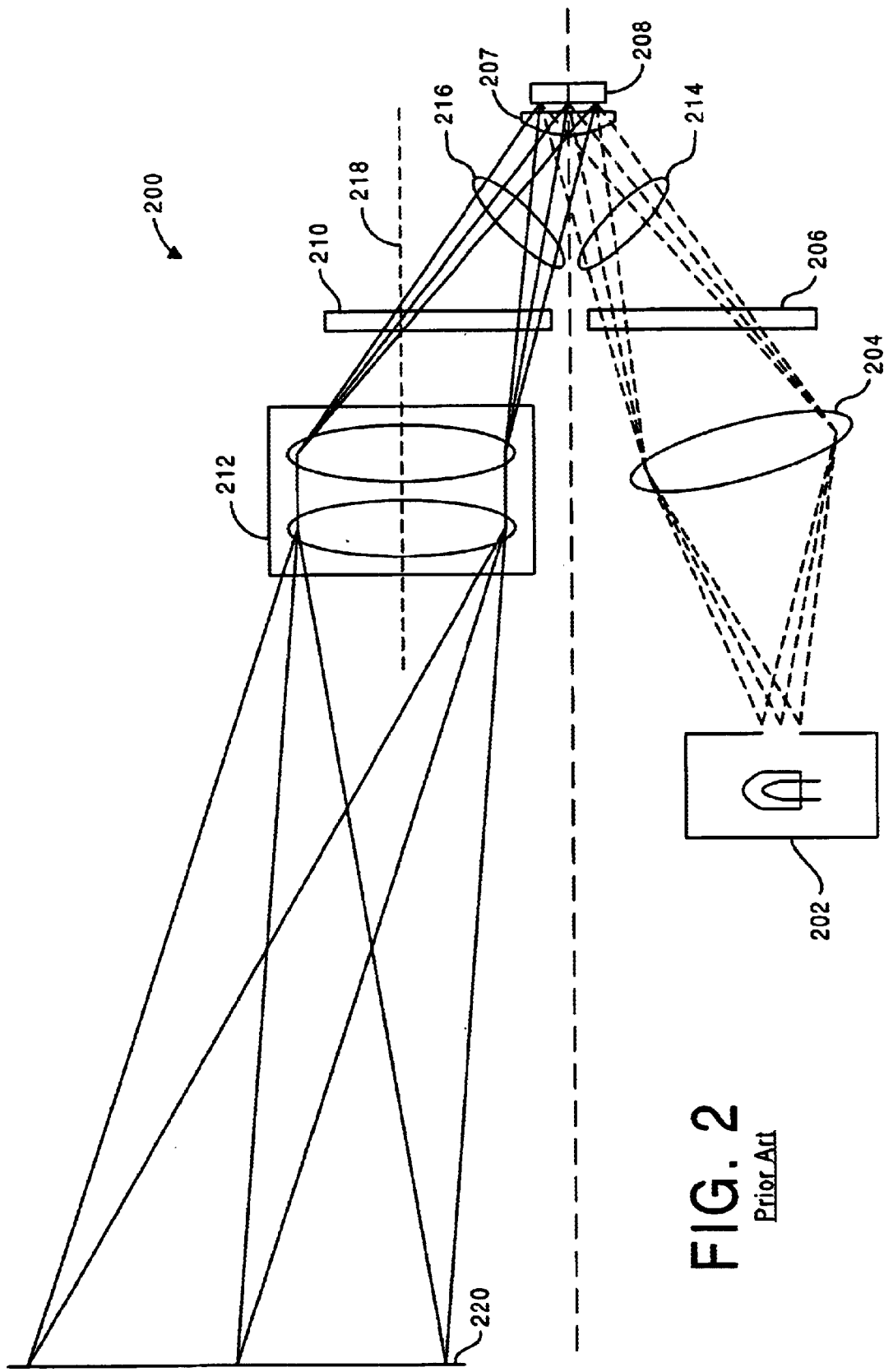
FIG. 2 is a block diagram of a prior art, off-axis projection system.
Figure 3:
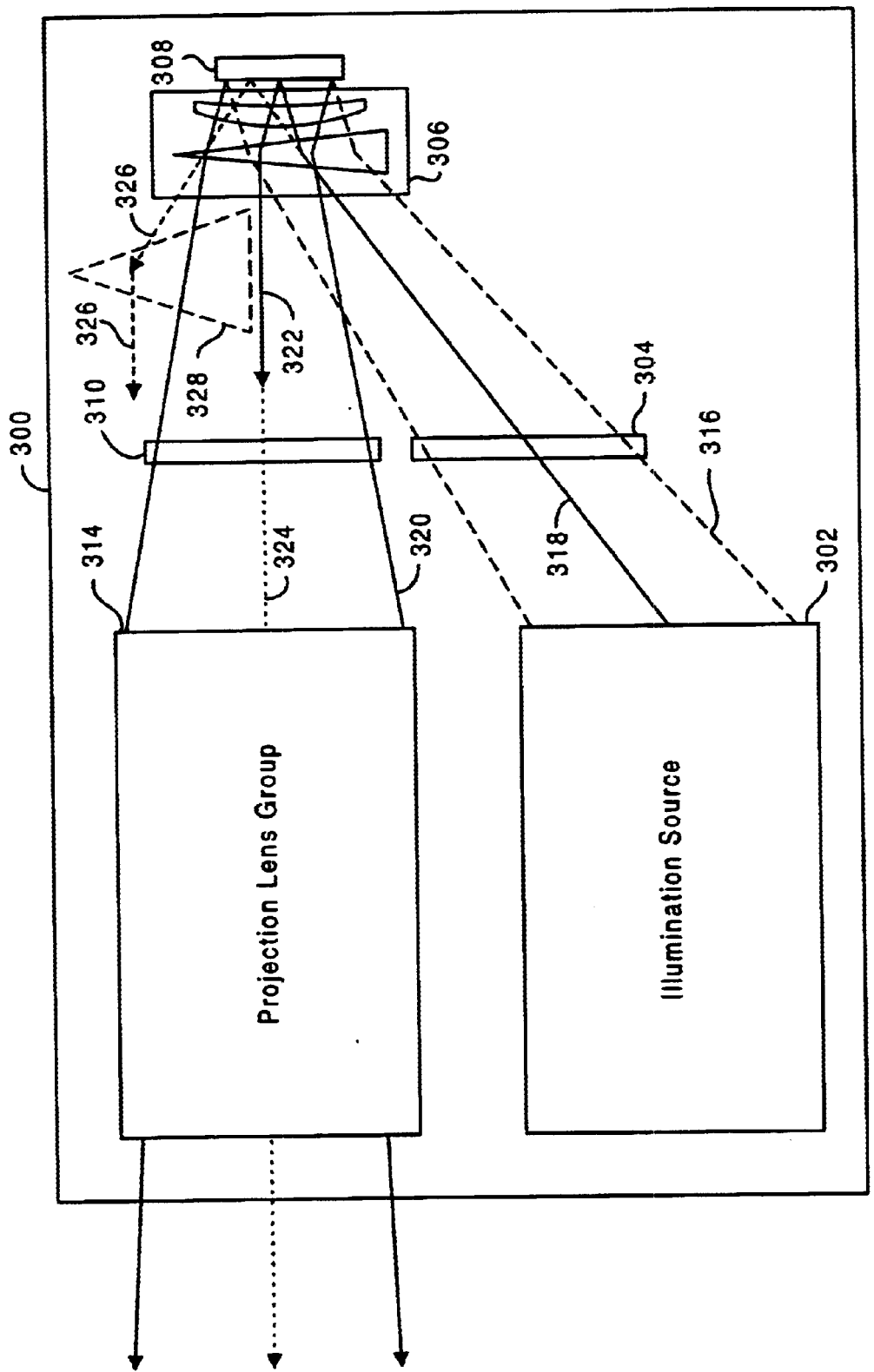
FIG. 3 is a block diagram of an off-axis projection system in accordance with the present invention.

FIG. 3 shows an off-axis projection system 300, including an illumination source 302, a polarizer 304, a field lens group 306, a reflective display device 308, an analyzer 310, and a projection lens group 314. Illumination source 302 generates an illumination beam 316, and directs illumination beam 316, along an optical path 318, through polarizer 304. Polarizer 304 linearly polarizes illumination beam 316 into a first polarized state, corresponding to the transmission axis of polarizer 304.

Field lens group 306 is disposed adjacent display device 308, and focuses the aperture stop (not shown) of illumination source 302 at a field stop (not shown) near the rear of projection lens group 314, thus avoiding the loss of much of the light of illumination beam 316. Field lens group 306 deviates illumination beam 316 with respect to optical path 318 to impinge on display device 308 at a reduced, but still non-zero, angle of incidence.

In this particular embodiment, display device 308 is a liquid crystal display (LCD). LCD 308 is controlled by a system, e.g., a computer or video signal source, (not shown), and modulates the polarity of selected portions (i.e., pixels) of illumination beam 316 to form an imaging beam 320, which is reflected along an optical path 322.

Field lens group 306 also deviates imaging beam 320, redirecting imaging beam 320 along optical path 322. Because field lens group 306 is de-centered with respect to optical axis 324 of projection lens group 314, field lens group 306 can be disposed to redirect imaging beam 320 along optical axis 324, such that optical path 322 is coincident with optical axis 324. In particular, LCD 308 is slightly de-centered with respect to optical axis 324. Without de-centered field lens group 306, imaging beam 320 would follow optical path 326.

Incorporating de-centered elements in field lens group 306, as opposed to de-centered projection optics, substantially reduces the aberrations introduced into the projected image, because the degree of aberration is related to the field of view of projection lens 314. In particular, classical distortion scales as the cube of the field-of-view (field-of-view$^3$). Coma is also an issue in wide field-of-view lenses, and as a basic aberration scales as the field-of-view to the first order. Accordingly, bending imaging beam 320 as close to display 308 as possible minimizes the aberrations in the projected image.

In view of this disclosure, however, those skilled in the art will understand that in certain applications, the de-centered elements of the field lens group may be displaced toward the projection optics and away from the display device without defeating the usefulness of the present invention. In fact, an optical wedge can be displaced toward projection lens group 314 to a position 328 where the wedge intercepts only imaging beam 320. So displaced, the wedge would need to be thicker in order to provide twice the angular beam deviation. Additionally, projection lens group 314 would need to be displaced upwardly to align the optical axis 324 with the imaging beam along redirected optical path 326. Despite such displacement, such de-centered elements are considered to be included in the field lens group.

Those skilled in the art will also understand that, in practical optical systems, minor adjustments are made to optimize system performance For example, imaging beam 320 may be displaced slightly with respect to optical axis 324 to optimize system optical performance. Therefore, the relational terms used herein (e.g., parallel, coincident, etc.) are understood to be interpreted broadly, so as to accommodate such minor adjustments.

Analyzer 310 is also a linear polarizer. Projection system 300 can operate in at least two different modes. For example, if the transmission axis of analyzer 310 is oriented parallel to the transmission axis of polarizer 304, then analyzer 310 will pass unmodulated portions and block modulated portions of imaging beam 320. On the other hand, if the transmission axis of analyzer 310 is oriented orthogonally with respect to the transmission axis of polarizer 304, then analyzer 310 will pass modulated portions and block unmodulated portions of imaging beam 320. In one embodiment, polarizer 304 and analyzer 310 are both fashioned from HN42HE polarizing material available from Polaroid Corporation.

Projection lens group 314 receives imaging beam 320 from analyzer 310, and focuses the beam to project an image onto a display surface (not shown). Because imaging beam 320 is traveling along or near to optical axis 324 of projection lens group 314, the paraxial portion (center) of projection lens group 314 is used to image the display. This advantageously facilitates the use of low f-number projection lenses, for example f2–f4, without inducing undue aberrations into the projected image.

Projection lens group 314 is tilted slightly (approx. 3.6°) with respect to optical path 322. Tilting the projection lens group 314 improves imagery over the display field, without causing an unacceptable amount of keystone distortion. Further, displacing field lens group 306 and LCD 308 with respect to optical axis 324, in conjunction with tilting the projection lens group 314, displaces the projected image by a desired amount above system axis 330. Those skilled in the art will understand that the degree of tilt of projection lens group 314 will necessarily vary from system to system, depending on the unique characteristics of each system, and in some cases may be completely eliminated.

Figure 4:
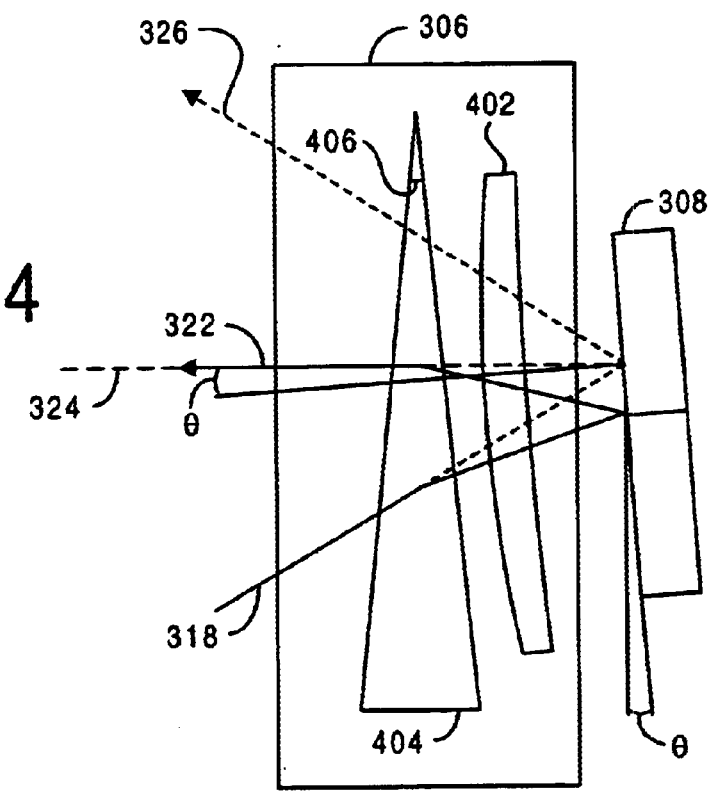
FIG. 4 is a cross sectional view of the field lens group of FIG. 3.

FIG. 4 is a cross-sectional view of field lens group 306, which is shown to include a centered field lens 402 and an optical wedge 404. Field lens 402 focuses the aperture stop of illumination source 302 at a field stop of the projection lens group 314 (FIG. 3), as described above. Optical wedge 404 deflects illumination beam 316 (FIG. 3) and imaging beam 320 (FIG. 3) as they pass through wedge 404, such that imaging beam 320 emerges from wedge 404 on optical path 322, which is coincident or near to coincident with optical axis 324 of projection lens group 314. The angular deviation of a light ray through optical wedge 404 depends on the index of refraction of wedge 404, the apex angle 406 of wedge 404, the ray's angle of incidence, and the wavelength of the incident light ray. The design of a wedge to yield a desired angular deviation is well within the abilities of one of ordinary skill in the optical arts, and is described in *Hecht, Optics* $2^{nd}$ Ed., 1987, pp. 163–166, which is incorporated herein by reference.

The deflection of imaging beam 320 by wedge 404 causes a tilt in the focal plane of projection lens group 314. This tilt in the focal plane is accommodated by tilting display device 308 with respect to optical axis 324 by an angle θ to align the reflective surface of display 308 with the plane of best focus of projection lens group 314. This adjustment minimizes or eliminates keystone distortion. Additionally, LCD 308 can be vertically de-centered with respect to optical axis 324 to further optimize the projected image.

Figure 5:
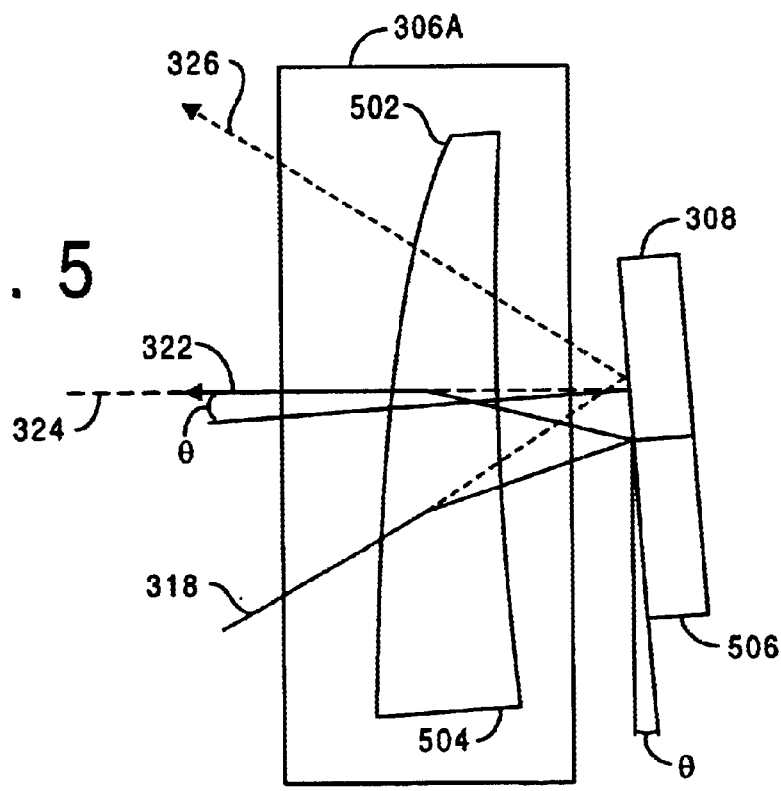
FIG. 5 is a cross sectional view of an alternate field lens group.

FIG. 5 is a cross-sectional view of an alternate field lens group 306A, wherein centered field lens 402 and wedge 404 are replaced by a single, de-centered field lens 502. Field lens 502 is substantially de-centered with respect to both display device 308 and optical axis 324 of projection lens group 314. In particular, the optical axis of field lens 502 is at or near its lower edge 504, which is disposed below the lower edge 506 of display device 308. For example, in a particular embodiment, display device 308 is approximately 15 mm in height, and the optical axis of de-centered field lens 504 is disposed 10–12 mm below the center of device 308.

Figure 6:
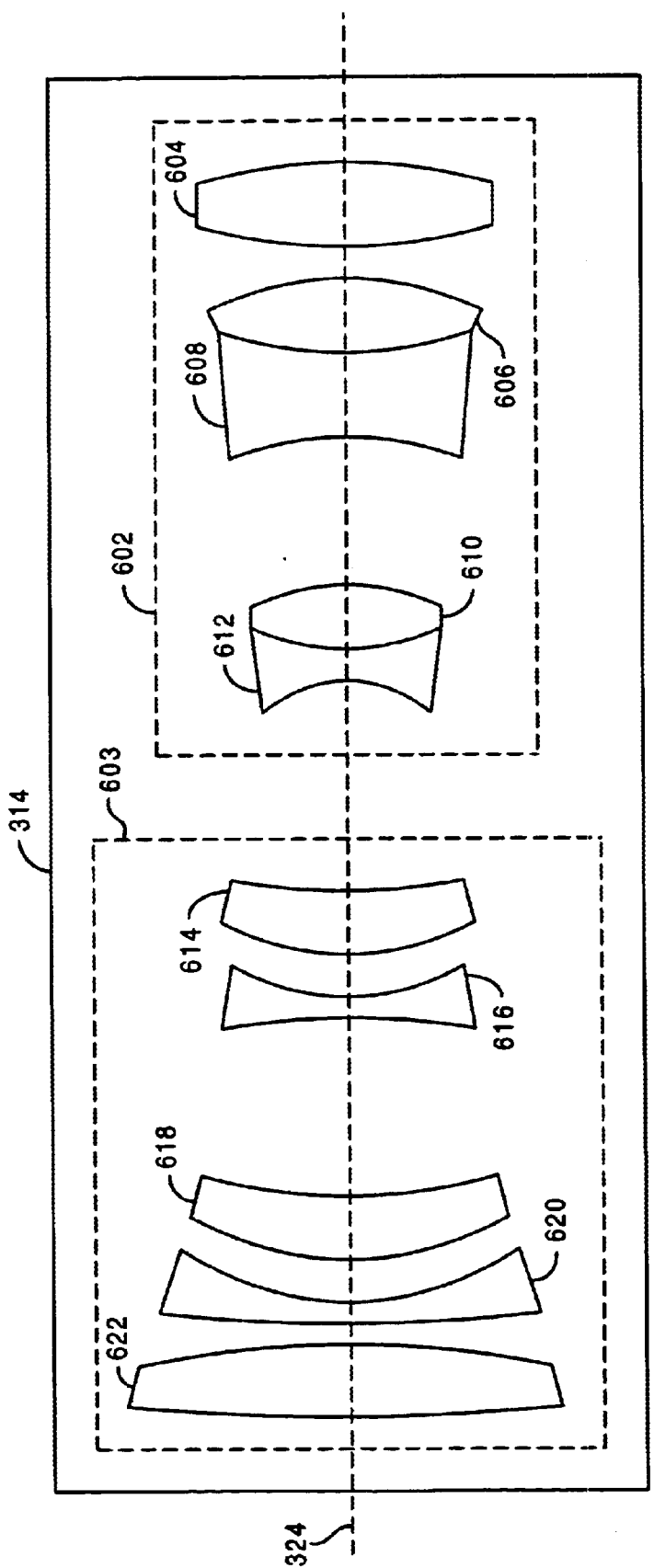
FIG. 6 is a cross sectional view, taken through the optical axis, of the projection lens group shown in FIG. 3.

FIG. 6 is a cross-sectional view showing projection lens group 314 in greater detail to include a zoom group 602 and a focus group 603, both disposed on optical axis 324 of projection lens group 314. Zoom group 602 includes a first bi-convex lens 604, a second bi-convex lens 606 in contact with a first bi-concave lens 608, and a third bi-convex lens 610 in contact with a second bi-concave lens 612, all aligned along optical axis 324. Zoom group 602 is moveable with respect to focus group 603, along optical axis 324, to adjust the magnification of the projected image. Focus group 603 includes a first meniscus lens 614, a bi-concave lens 616, a second meniscus lens 618, a third meniscus lens 620, and a bi-convex lens 622, all aligned along optical axis 324. Second meniscus lens 618 is moveable with respect to the remaining lenses of focus group 603, along optical axis 324, to focus the projected image.

Figure 7:
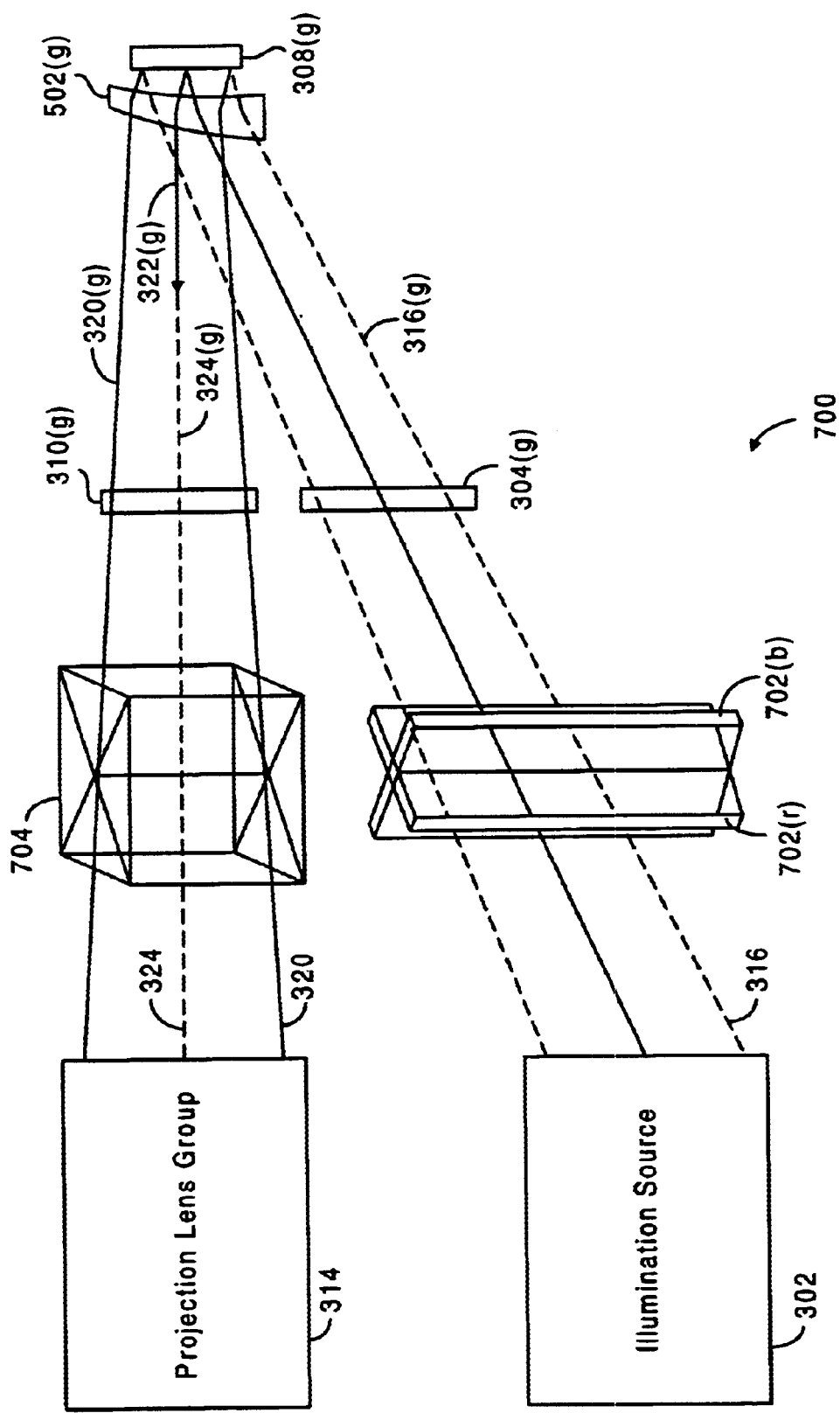
FIG. 7 is a perspective view showing one channel of a multi-color projection system in accordance with the present invention.

FIG. 7 is a perspective view, showing one channel of a multi-color projection system 700 in accordance with the present invention. Projection system 700 is similar to projection system 300, except that two crossed dichroic plates 702(*r*) and 702(*b*) are disposed in illumination beam 316, and a color cube 704 is disposed in imaging beam 320. Dichroic plates 702(*r*) and 702(*b*) separate illumination beam 316 into red 316(*r*) (FIG. 8), blue 316(*b*) (FIG. 8), and green 316(*g*) colored illumination beams, and direct each colored illumination beam 316(*r, b,* and *g*) to a respective one of three LCDs 308(*r*) (FIG. 8), 308(*b*) (FIG. 8), and 308(*g*). LCDs 308(*r, b,* and *g*) modulate the colored illumination beams 316(*r, b,* and *g*) to form colored imaging beams 320(*r, b,* and *g*), respectively, and reflect the colored imaging beams 320(*r, b,* and *g*) back toward color cube 704 which recombines the colored imaging beams 320(*r, b,* and *g*) to form imaging beam 320. De-centered field lenses 502(*r, b,* and *g*) redirect colored imaging beams 320(*r, b,* and *g*) along optical paths 322(r, b, and g), which are coincident or nearly coincident to respective segments 324(r, b, and g) of optical axis 324 of projection lens group 314. Dichroic plates 702(r) and 702(b) are both approximately 3 mm thick, and form angles of 45° and 135°, respectively, with respect to both illumination beam 316 and imaging beam 320. The angular separation between illumination beam 316 and imaging beam 320, in conjunction with the color separation by dichroic plates 702(r and b), allows separate polarizers 304(r, b, and g) and separate analyzers 310(r, b, and g) to be used for each color channel, advantageously decoupling the polarization and color separation processes. An aberration-compensating element (e.g., a weak cylinder lens) may be incorporated into projection lens group 314 to correct for any astigmatism induced across the projected image by dichroic plates 702(r and b).

Figure 8:
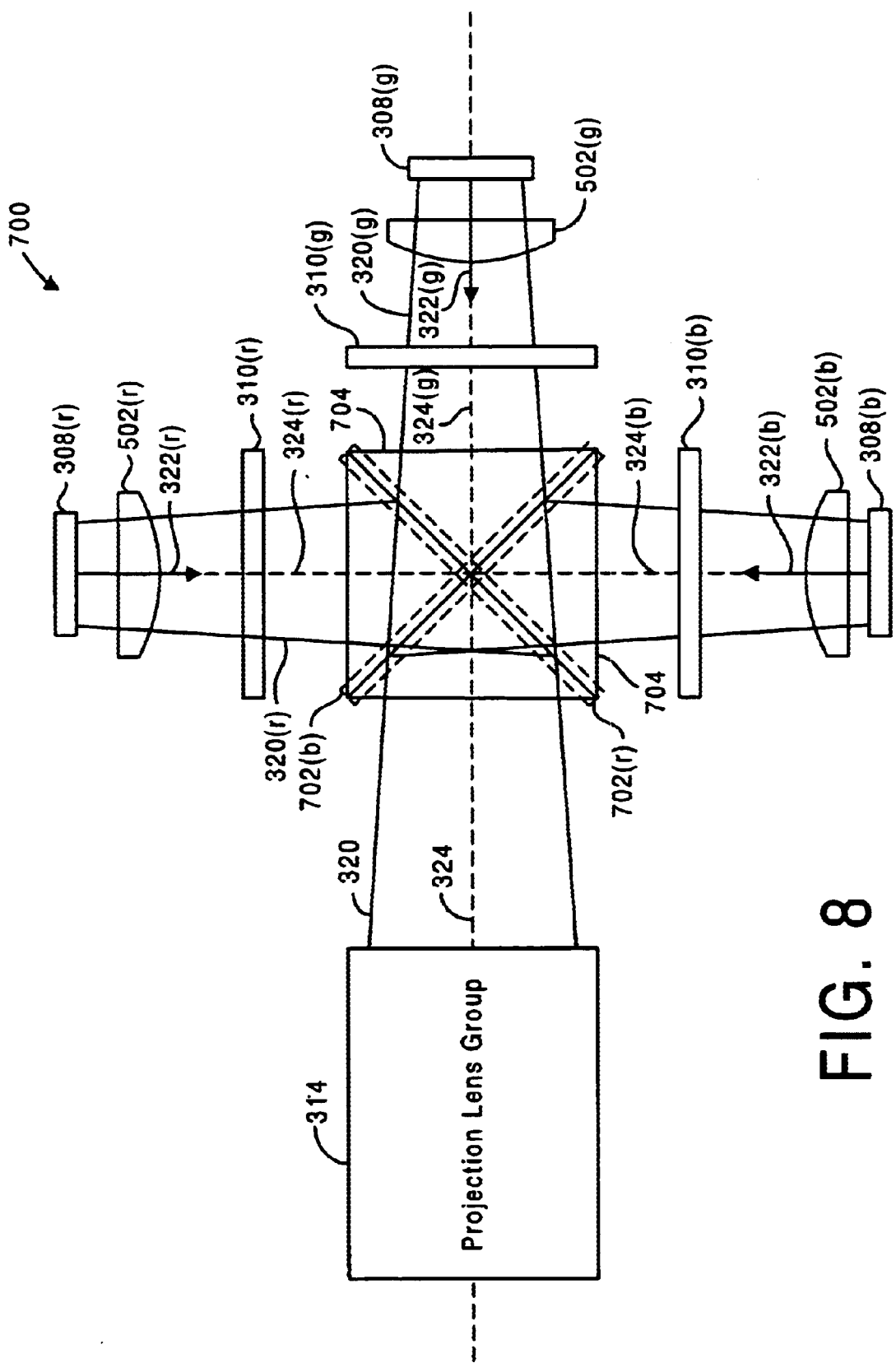
FIG. 8 is a block diagram showing a top view showing all of the channels of the projection system of FIG. 7.

FIG. 8 shows a top view of projection system 700, including the remaining color channels of the system. Optical axis 324 lies in the plane of the page, while imaging beam 320 obscures the view of illumination beam 316, which rises from illumination source 302 located beneath the plane of the page. Projection lens group 314 extends through the plane of the page, and obscures the view of illumination source 302. Similarly, analyzers 310(r, b and g) obscure the view of polarizers 304(r, b, and g), respectively.

FIGS. 9(A–J) set forth an optical prescription that details a particular embodiment of the present invention. The embodiment set forth in the optical prescription is not identical to any of the embodiments set forth in the other figures. Rather, the surfaces set forth in the optical prescription correspond to the following elements of a rear projection system according to the present invention as follows:

Surfaces 1–6 correspond to a rear projection folding mirror;
Surfaces 7–23 correspond to a projection lens group;
Surfaces 24–25 correspond to a recombining color cube;
Surfaces 26–29 and 38–41 correspond to a field lens;
Surfaces 30–33, 34–37, and 50-IMA correspond to an imaging device;
Surfaces 42–43 and 45 are dummy surfaces for physical layout purposes; and
Surface 44 corresponds to the exit aperture location for an illumination source.

Those skilled in the art will recognize that the scope of the invention is not limited by the specific optical prescription provided.

The description of particular embodiments of the present invention is now complete. Many of the described features may be substituted, altered or omitted without departing from the scope of the invention. For example, alternate displays such as deformable mirror devices, may be substituted for the reflective LCDs. As another example, dichroic plates 702(r and b) may be disposed in crossed fashion, and other color combiners such as a color cube may be substituted for the top portions of dichroic plates 702(r and b). These and other deviations from the particular embodiments shown will be apparent to those skilled in the art, particularly in view of the foregoing disclosure.

We claim:

1. A projection system comprising:
   an illumination source for emitting an illumination beam;
   a reflective display device for modulating said illumination beam to form a reflected imaging beam;
   a projection lens group having an optical axis; and
   a field lens group de-centered with respect to said optical axis of said projection lens group, said field lens group being disposed to redirect said illumination beam to illuminate said display device at a non-zero angle of incidence, and to redirect said reflected imaging beam along an optical path parallel to said optical axis of said projection lens group.

2. A projection system according to claim 1, wherein said optical path of said reflected imaging beam is coincident with said optical axis of said projection lens group.

3. A projection system according to claim 1, wherein said reflective display device is disposed on said optical axis of said projection lens group.

4. A projection system according to claim 1, wherein said field lens group includes:
   a field lens centered with respect to said optical axis of said projection lens group; and
   an optical wedge.

5. A projection system according to claim 1, wherein said field lens group includes a field lens de-centered with respect to said optical axis of said projection lens group.

6. A projection system according to claim 5, wherein said field lens group consists essentially of a field lens de-centered with respect to said optical axis of said projection lens group.

7. A projection system according to claim 1, wherein said display device is tilted with respect to said optical axis of said projection lens group.

8. A projection system according to claim 7, wherein said display device is tilted with respect to said optical axis of said projection lens group by an amount sufficient to align the surface of said display device with the focal plane of the combination of said projection lens group and said field lens group.

9. A projection system according to claim 1, wherein said field lens group is tilted with respect to said optical axis of said projection lens group.

10. A projection system according to claim 9, wherein said field lens group is tilted with respect to said optical axis of said projection lens group by an amount sufficient to align the surface of said display device with the focal plane of the combination of said projection lens group and said field lens group.

11. A projection system according to claim 1, further comprising:
    a polarizer disposed between said illumination source and said display device, to polarize said illumination beam; and
    an analyzer, separate from said polarizer, disposed between said field lens group and said projection lens group, to analyze said imaging beam.

12. A projection system according to claim 11, further comprising:
    a color separator disposed between said illumination source and said polarizer, to separate said illumination beam into a plurality of colored illumination beams;
    a plurality of display devices, each associated with a respective one of said colored illumination beams, for modulating the associated colored illumination beams to form associated colored imaging beams;
    a plurality of field lens groups, each associated with one of said plurality of display devices, each de-centered with respect to said optical axis of said projection lens group, and each disposed to direct an associated colored imaging beam along an optical path parallel to said optical axis of said projection lens group; and
    a color combiner for combining the colored imaging beams to form said imaging beam.

13. A projection system according claim 12, further comprising:
- a plurality of polarizers, each associated with one of said plurality of display devices and being disposed between said associated display device and said color separator; and
- a plurality of analyzers, each associated with one of said plurality of display devices and being disposed between said associated display device and said color combining means.

14. A method for projecting a display image comprising:
providing a reflective display device;
providing a projection lens group having an optical axis;
directing an illumination beam to illuminate said display device at a nonzero angle of incidence;
modulating said illumination beam with said display device to form a reflected imaging beam; and
redirecting said reflected imaging beam along an optical path parallel to said optical axis of said projection lens group by disposing a field lens group, having an optical axis de-centered with respect to said optical axis of said projection lens group, in said optical path of said imaging beam.

15. A method according to claim 14, wherein said step of redirecting said reflected imaging beam along an optical path parallel to said optical axis of said projection lens group comprises redirecting said reflected imaging beam along an optical path coincident with said optical axis of said projection lens group.

16. A method according to claim 14, wherein said step of providing a reflective display device comprises disposing said reflective display device on said optical axis of said projection lens group.

17. A method according to claim 14, wherein said step of redirecting said imaging beam comprises disposing an optical wedge in said optical path of said imaging beam.

18. A method according to claim 14, wherein said step of redirecting said imaging beam comprises disposing a field lens, having an optical axis de-centered with respect to said optical axis of said projection lens group, in said optical path of said imaging beam.

19. A method according to claim 14, wherein said step of modulating said illumination beam with said display device comprises aligning the surface of said display device with the focal plane of said projection lens group by tilting said display device with respect to said optical axis of said projection lens group.

20. A method according to claim 14, further comprising:
polarizing said illumination beam; and
analyzing said imaging beam with an analyzer separate from said polarizer.

21. A method according to claim 14, further comprising:
separating said illumination beam into a plurality of colored illumination beams;
modulating each of said colored illumination beams with an associated on of a plurality of reflective display devices to form a plurality of colored imaging beams;
redirecting each of said colored imaging beams along an optical path parallel to said optical path of said projection lens group with an associated one of a plurality of field lens groups each having an optical axis de-centered with respect to said optical axis of said projection lens group; and
recombining said plurality of colored imaging beams to form said imaging beam.

22. A method according to claim 21, further comprising:
polarizing each of said colored illumination beams with one of a plurality of associated polarizers; and
analyzing each of said colored imaging beams with one of a plurality of associated analyzers, said associated analyzers being separate from said associated polarizers.

* * * * *